(12) United States Patent
Chen

(10) Patent No.: US 8,325,265 B2
(45) Date of Patent: Dec. 4, 2012

(54) CAMERA MODULE HAVING EXTENDED DEPTH OF FOCUS MODE AND AUTOFOCUS MODE AND METHOD OF OPERATING THE SAME

(75) Inventor: Ga-Lane Chen, Santa Clara, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 363 days.

(21) Appl. No.: 12/832,997

(22) Filed: Jul. 9, 2010

(65) Prior Publication Data

US 2011/0261252 A1 Oct. 27, 2011

(30) Foreign Application Priority Data

Apr. 21, 2010 (TW) ................................ 99112497 A

(51) Int. Cl.
*H04N 5/225* (2006.01)
*H04N 5/232* (2006.01)

(52) U.S. Cl. .................... 348/335; 348/349; 348/374

(58) Field of Classification Search .................. 348/374, 348/345, 208.5, 208.12, 335, 340, 376, 349, 348/353
See application file for complete search history.

(56) References Cited

U.S. PATENT DOCUMENTS

| | | | | |
|---|---|---|---|---|
| 7,729,603 B2 * | 6/2010 | Xu et al. | ........................ | 396/89 |
| 7,796,875 B2 * | 9/2010 | Lin et al. | ........................ | 396/95 |
| 7,920,172 B2 * | 4/2011 | Chanas et al. | ............. | 348/222.1 |
| 8,149,324 B2 * | 4/2012 | Oikawa | ......................... | 348/349 |
| 8,212,889 B2 * | 7/2012 | Chanas et al. | ............. | 348/224.1 |
| 2003/0227559 A1 * | 12/2003 | Rouvinen et al. | ............. | 348/335 |
| 2006/0103754 A1 * | 5/2006 | Wenstrand et al. | ........... | 348/349 |
| 2006/0193063 A1 * | 8/2006 | Xu et al. | ........................ | 359/754 |
| 2006/0198622 A1 * | 9/2006 | Xu et al. | ........................ | 396/89 |
| 2006/0203095 A1 * | 9/2006 | Vittu | ......................... | 348/208.12 |
| 2007/0229254 A1 * | 10/2007 | Chen | ......................... | 340/540 |
| 2008/0080019 A1 * | 4/2008 | Hayashi et al. | ............... | 358/474 |
| 2009/0009653 A1 * | 1/2009 | Tsai | ............................. | 348/353 |
| 2009/0310224 A1 * | 12/2009 | Yu et al. | ....................... | 359/666 |
| 2010/0044555 A1 * | 2/2010 | Ohara et al. | .................. | 250/216 |
| 2010/0271534 A1 * | 10/2010 | Lin | ................................ | 348/340 |
| 2011/0019065 A1 * | 1/2011 | Chanas et al. | ............... | 348/345 |
| 2011/0109749 A1 * | 5/2011 | Chanas et al. | ............... | 348/164 |
| 2011/0261249 A1 * | 10/2011 | Saunders et al. | ............. | 348/345 |
| 2012/0127360 A1 * | 5/2012 | Devaux et al. | ................ | 348/349 |

FOREIGN PATENT DOCUMENTS

| | | | |
|---|---|---|---|
| FR | 2949003 A1 * | 2/2011 | |
| JP | 05053042 A * | 3/1993 | |
| WO | WO 2011018575 A1 * | 2/2011 | |

* cited by examiner

*Primary Examiner* — John Villecco
(74) *Attorney, Agent, or Firm* — Altis Law Group, Inc.

(57) ABSTRACT

An imaging system includes a lens assembly, an image sensor, an image processing unit, an actuator, and a control unit. The lens assembly is configured for focusing a subject image. The image sensor is located at the image side of the lens assembly for providing image information corresponding to the subject image. The image processing unit is electrically connected to the image sensor for modifying the image information in a digital image process. The actuator is connected to the lens assembly for adjusting the depth of field of the lens assembly. The control unit is electrically connected to the image sensor, the image processing unit and the actuator for receiving the electronic information to control the image processing unit or the actuator so as to provide a clear image.

15 Claims, 3 Drawing Sheets

CAMERA MODULE HAVING EXTENDED DEPTH OF FOCUS MODE AND AUTOFOCUS MODE AND METHOD OF OPERATING THE SAME

BACKGROUND

1. Technical Field

The present disclosure relates generally to an imaging system and, particularly, to an imaging system having both an extended depth of focus (EDoF) mode and an autofocus (AF) mode.

2. Description of Related Art

In optics, particularly as it relates to photography and film, the depth of field (DoF) is a region of a scene that appears acceptably sharpness in the image. Although a lens can precisely focus at only one distance, the decrease in sharpness is gradual on each side of the focused distance. Within the DoF, the unsharpness is imperceptible under normal viewing conditions. The DoF is determined by the camera-to-subject distance, the lens focal length, the lens f-number (the ratio of lens focal length to aperture diameter), and the format size or circle of confusion criterion.

An Autofocus (AF) imaging system focuses automatically and mechanically. Adjustment of the optical system has to be constantly performed when focusing on subjects at various distances, and considerable energy is thereby consumed.

An extended depth of focus (EDoF) imaging system includes a program for extending DoF. The EDoF imaging system processes image importations in a digital image process to give a resulting image with increased sharpness. When focus is set to a hyperfocal distance, the DoF extends from half the hyperfocal distance to infinity, and such a DoF is the largest possible. However, acquiring sufficient depth of field for the EDoF imaging system is particularly challenging within a small camera-to-subject distance, and the resulting image of neighboring subjects may be blurred.

Such EDoF imaging systems do not cooperate with the AF imaging system. Therefore, it is desirable to provide an imaging system which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the disclosure will now be described in detail with reference to the accompanying drawings.

Figure 1:
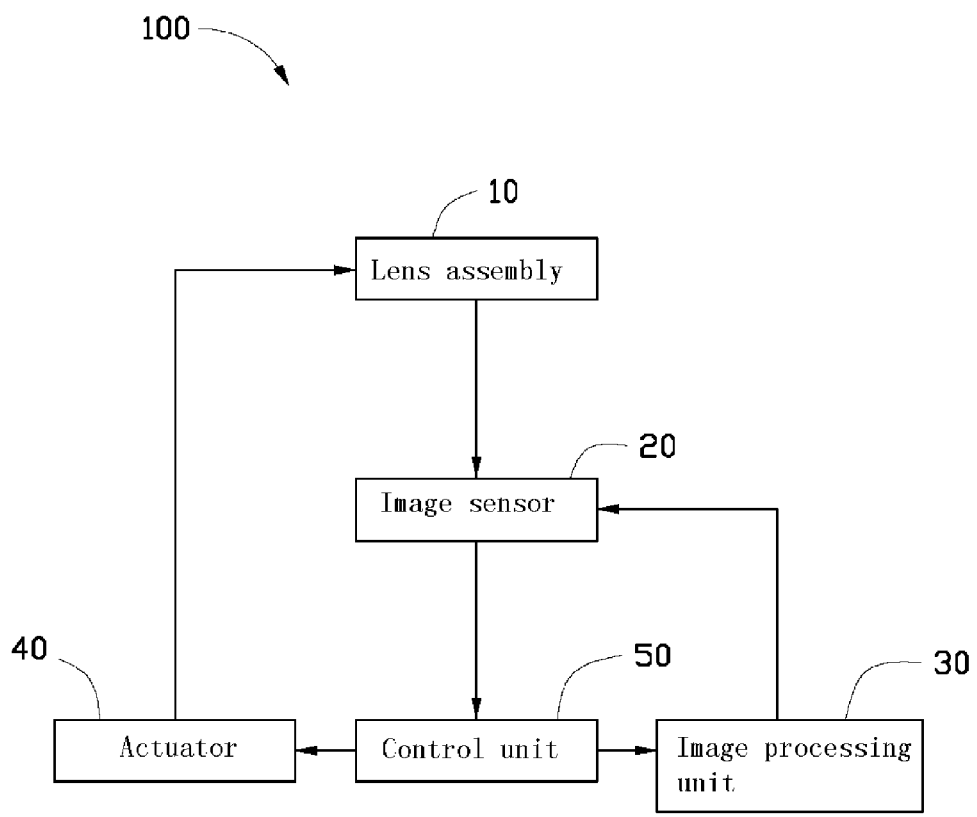
FIG. 1 is a schematic functional block diagram of an imaging system in accordance with an embodiment of the present disclosure.
Figure 2:
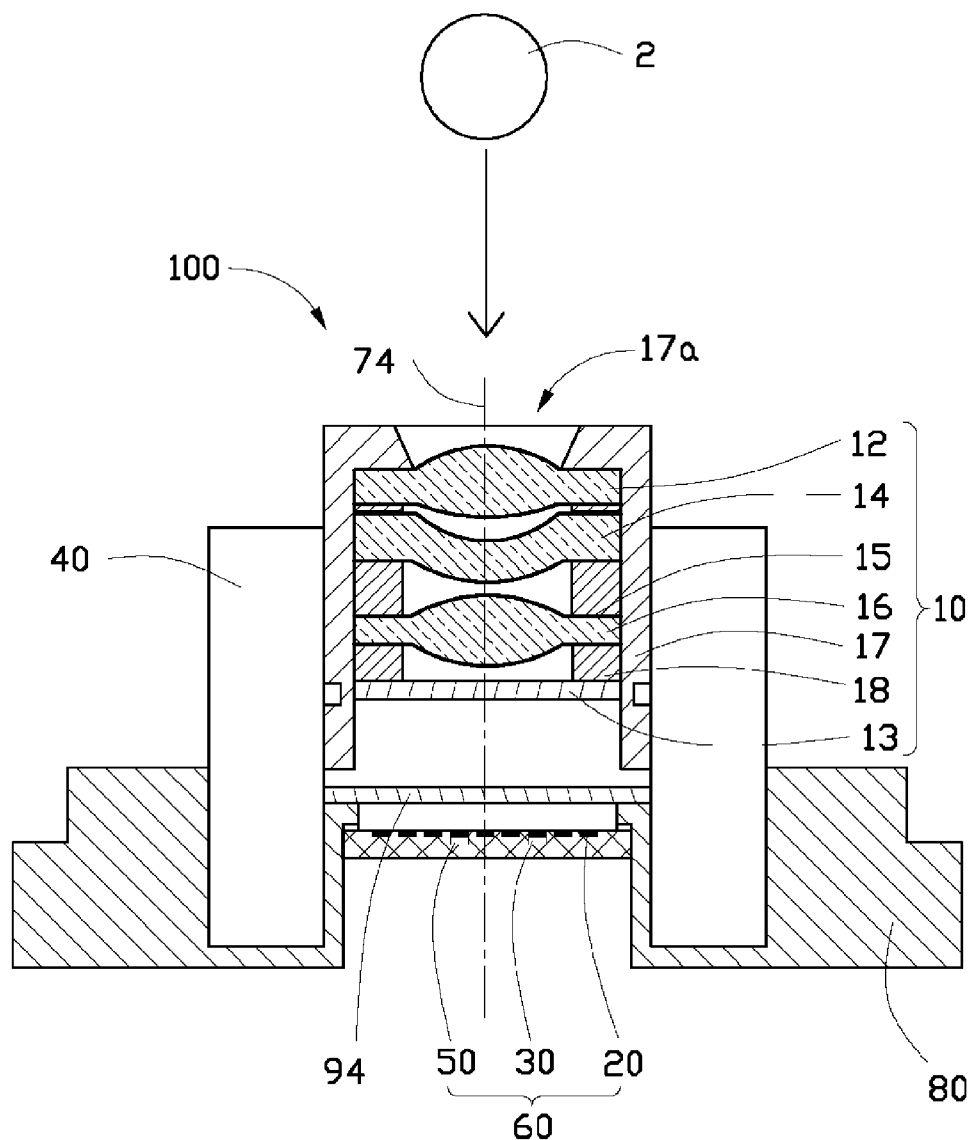
FIG. 2 is a schematic cross section of the imaging system of FIG. 1.

Referring to FIG. 1 and FIG. 2, an imaging system 100, such as a camera module, includes a lens assembly 10, an image sensor 20, an image processing unit 30, an actuator 40 and a control unit 50. In addition, the imaging system 100 can further include a holder 80, but is not limited thereto.

The lens assembly 10 is configured for imaging a subject 2. The lens assembly 10 can be linearly movable to change focal length thereof. The lens assembly 10 includes at least one lens, for example lenses 12, 14, 16, a filter 13, a lens barrel 17 and spacers 18. The lenses 12, 14 and 16 can be fixed-focus lenses such as glass lenses and plastic lenses, or zoom lenses such as liquid crystal lens and liquid lens. In the illustrated embodiment, each of the lenses 12, 14 and 16 is aspherical, and the surfaces of the lenses 12, 14 and 16 are coated with anti-reflective films 15.

The lenses 12, 14, 16 and the filter 13 are held together by the lens barrel 17. Two adjacent lenses thereof are separated from each other via a ring-shaped spacer 18. Accordingly, the optical axis 74 of the lens assembly 10 can be maintained, for example, at the center line of the imaging system 100. The external surface of lens barrel 17 can be a smooth surface without screw thread, such that the lens barrel 17 can be easily moved by the actuator 40. The lens barrel 17 defines a truncated-cone-shaped through hole 17a located at an object side of the lens assembly 10. Light reflected from a subject can pass through the through hole 17a and strike on the lenses 12, 14 and 16 of the lens assembly 10, whereby the incident angle are controlled.

The filter 13 for example, infrared cut filter, is located at the image side of the lens assembly 10, can also be received and fixed in the lens barrel 17, to further improve the operational stability of the imaging system 10. The lens barrel 17 is received in the holder 80, such that the lens assembly 10 is held by the holder 80. As such, the lens barrel 17 is kept stationary during autofocus of the imaging system 100.

The image sensor 20 is located at the image side of the lens assembly 10 to detect the image corresponding to the subject 2, and produce image information in the form of electronic signals corresponding to the image. The image sensor 20 can be a charge-coupled device (CCD) active pixel array device or another suitable sensor, for example, a complementary metal oxide semiconductor (CMOS) active pixel array device. The number of lenses in the lens assembly 10 may be associated with the resolution ability of the image sensor 20. The lens assembly 10 may include more than four lenses in accordance with an image sensor 20 in three million dots per inch (DPI).

The control unit 50 is electrically connected to the image sensor 20, the actuator 40 and the image processing unit 30. The control unit 50 can identify an image resolution corresponding to the image information produced by the image sensor 20. The image resolution may be expressed in modulation transfer function (MTF), contrast and/or sharpness. The control unit 50 drives the image processing unit 30 in an EDoF mode, when the image processing unit 30 is able to provide a resulting image with acceptable resolution, or drives the actuator 40 in an AF mode, when the image processing unit 30 is unable to provide an acceptably sharp image.

The switch between the EDoF mode and the AF mode can be set according to a predetermined resolution value in MTF, contrast and/or sharpness, such as a resolution about 15% in MTF or in contrast, a critical resolution in the EDoF mode, to provide a resulting sharp image. When the resolution of the image information equals or exceeds 15% in MTF or in contrast, the EDoF mode is turned on and the AF mode is turned off; and when the resolution of the image information is less than 15%, the AF mode is turned on and the EDoF mode is turned off.

The image processing unit 30 is electrically connected to the image sensor 20. The image processing unit 30 includes a digital image processing program for providing a clear image. In the EDoF mode, the image processing unit 30 processes the image information in calculation to output a resulting image information with increased sharpness, and the imaging system 100 does not have to operate the actuator 40. The focus in the EDoF mode can be set to a hyperfocal distance, such that the DoF extends from half the hyperfocal distance to infinity. Energy for operating the actuator 40 is thereby conserved.

The actuator 40 is mechanically connected to the lens assembly 10 for adjusting the DoF of the imaging system 100. In AF mode, the actuator 40 is controlled by the control unit 50 to change the focal length or position of the lens assembly 10 for providing a clear image. Accordingly, the DoF is auto adjusted in the AF mode. The actuator 40 can be a voice coil motor (VCM), a piezoelectric actuator, a micro electro mechanical systems (MEMS) actuator and a shape memory alloy (SMA) actuator to change the positions of the lenses 12, 14 and 16. In case that at least one of the lenses 12, 14 and 16 is a liquid crystal lens or a liquid lens, the actuator 40 may be a liquid crystal actuator and a liquid lens actuator to change the focal length of the lens.

The AF mode is an offset to the EDoF mode in the imaging system 100. When the imaging system 100 is unable to provide an acceptably sharp image through only the digital image processing program, the lens assembly 10 is mechanically adjusted by the actuator 40. A destination of the lens assembly 10 is produced and compared with the actual position of the lens assembly 10 by the control unit 50, and a control signal is provided to the actuator 40 according to the difference.

According to the operation of the imaging system 100, the switch between the AF mode and the EDoF mode corresponds to a subject distance about 40 centimeters (cm) as a result. When distance between the subject 2 and the imaging system 100 equals or exceeds 40 cm, the imaging system 100 works in the EDoF mode; and when distance is less than 40 cm, especially in a range from 10 cm to 40 cm, the imaging system 100 works in the AF mode.

The image sensor 20, the image processing unit 30 and the control unit 50 can be integrated in one chip 60, such as a CMOS chip or a CCD chip. The chip 60 may be held by the holder 80. A transparent cover 94, such as a glass plate, may be employed to cover the image sensor 20 for protection.

Figure 3:
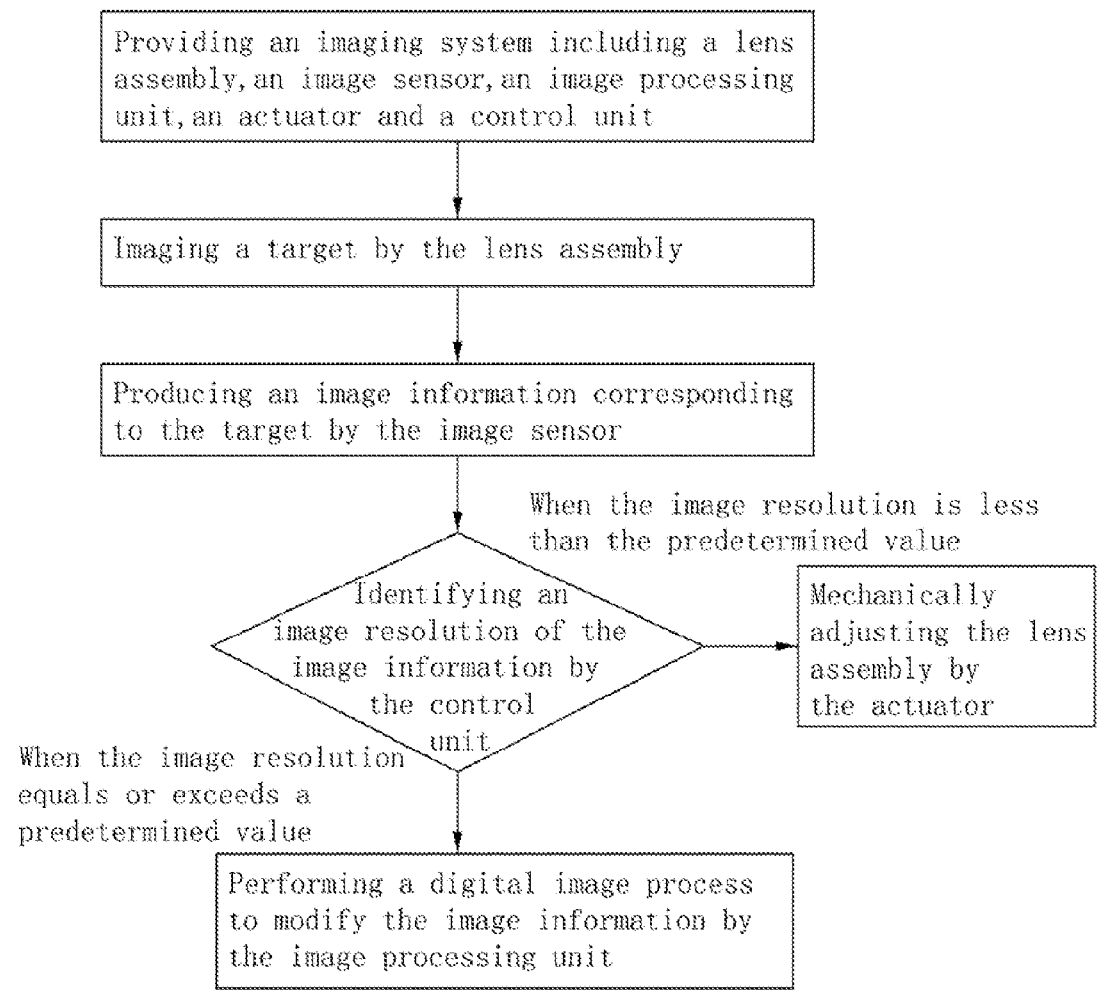
FIG. 3 is a schematic operational flowchart of the imaging system of FIG. 1.

Referring to FIG. 3, an embodiment of a method of operating the imaging system 100 is provided. The imaging system 100 is first provided. The subject 2 is imaged by the lens assembly 10 on the image sensor 20. The image is detected by the image sensor 20, and the image information corresponding to the subject is output to the control unit 50. The image resolution is identified by the control unit 50. When the resolution of the image information equals or exceeds a predetermined value, such as the critical resolution about 15% in MTF or in contrast, the image processing unit 30 is driven to transfer the image information. When the resolution of the image information is less than the predetermined value, the actuator 30 is driven to adjust the lens assembly 10.

The critical factor of switching the EDoF mode and the AF mode should not be limited by this embodiment. As predetermined resolution increases, the imaging system 100 more frequently images in the AF mode. Conversely, reduced predetermined resolution decreases activation of the actuator, and less power is required. To maintain resulting image quality and power conservation, resolution is advantageously in a range from 10% to 20% in MTF or in contrast.

The arrangements, numbers, positions and structures of the lens assembly 10, the image sensor 20, the image processing unit 30, the actuator 40 and the control unit 50 can be adjusted as required.

The present disclosure integrates both the EDoF mode and the AF mode in one imaging system. The switch between the EDoF mode and the AF mode is controlled by the control unit. When the image processing unit is able to provide a resulting image with acceptable sharpness, the control unit drives the image processing unit in the EDoF mode to process the image information digitally; and when the image processing unit is unable to provide an acceptably sharp image in the EDoF mode, the control unit drives the actuator in the AF mode to mechanically adjust the lens assembly. Accordingly, considerable power is conserved, and clear images can be obtained in a greater depth of focus.

It is to be understood, however, that even though numerous characteristics and advantages of various embodiments have been set forth in the foregoing description, together with details of the structures and functions of the embodiments, the disclosure is illustrative only; and that changes may be made in detail, especially in matters of arrangement of parts within the principles of the invention to the full extent indicated by the broad general meaning of the terms in which the appended claims are expressed.

What is claimed is:

1. A camera module, comprising:
a lens assembly configured to image a subject;
an image sensor located at one side of the lens assembly to produce an image information corresponding to the subject;
an image processing unit electrically connected to the image sensor to modify the image information in a digital image process;
an actuator connected to the lens assembly to mechanically adjust the lens assembly; and
a control unit electrically connected to the image sensor, the image processing unit and the actuator, the control unit identifying an image resolution expressed in modulation transfer function or in contrast corresponding to the image information;
wherein the control unit drives the image processing unit to modify the image information when the image resolution of the image information equals or exceeds a predetermined value; and the control unit drives the actuator to mechanically adjust the lens assembly when the image resolution of the image information is less than the predetermined value.

2. The camera module of claim 1, wherein the predetermined value is in a range from 10% to 20% in modulation transfer function or in contrast.

3. The camera module of claim 1, wherein the actuator is selected from a group consisting of a voice coil motor, a piezoelectric actuator, a micro electro mechanical systems actuator and a shape memory alloy actuator.

4. The camera module of claim 1, wherein the lens assembly comprises a zoom lens, and the control unit drives the actuator to adjust a focal length of the zoom lens.

5. The camera module of claim 4, wherein the actuator is selected from a group consisting of a liquid crystal actuator and a liquid lens actuator.

6. The camera module of claim 1, wherein the image sensor, the image processing unit and the control unit are integrated in a charge coupled device chip or a complementary metal oxide semiconductor chip.

7. The camera module of claim 1, wherein the lens assembly comprises a plurality of aspheric lenses.

8. The camera module of claim 7, wherein the lens assembly comprises a plurality of anti-reflective coating on the aspheric lenses.

9. A method of operating a camera module, the method comprising:
- providing the camera module, the camera module comprising a lens assembly and an image sensor located at one side of the lens assembly imaging a subject by the lens assembly;
- producing an image information corresponding to the subject by the image sensor; and
- performing a digital image process to modify the image information when an image resolution of the image information equals or exceeds a predetermined value;
- mechanically adjusting the lens assembly when the image resolution of the image information is less than the predetermined value.

10. The method of claim 9, wherein the predetermined value is in a range from 10% to 20% expressed in modulation transfer function or in contrast.

11. The method of claim 9, wherein the camera module further comprises an image processing unit, an actuator and a control unit.

12. The method of claim 11, wherein the digital image process is performed by the image processing unit.

13. The method of claim 11, wherein the lens assembly is mechanically adjusted by the actuator.

14. The method of claim 11, wherein the image processing unit and the actuator are driven by the control unit.

15. A camera module, comprising:
- a lens assembly having at least one lens configured to form an image;
- an image sensor located at one side of the lens assembly and configured to detect the image formed by the at least one lens to generate an image information;
- an image processing unit configured to modify the image information to output a resulting image information;
- an actuator connected to the lens assembly and configured to move the lens assembly relative to the image sensor; and
- a control unit electrically connected to the image sensor, the image processing unit and the actuator, the control unit being configured to drive the image processing unit to modify the image information when the image resolution of the image information equals or exceeds a predetermined value, and to drive the actuator to move the lens assembly relative to the image sensor when the image resolution of the image information is less than the predetermined value.

* * * * *